United States Patent Office  3,250,183
Patented May 10, 1966

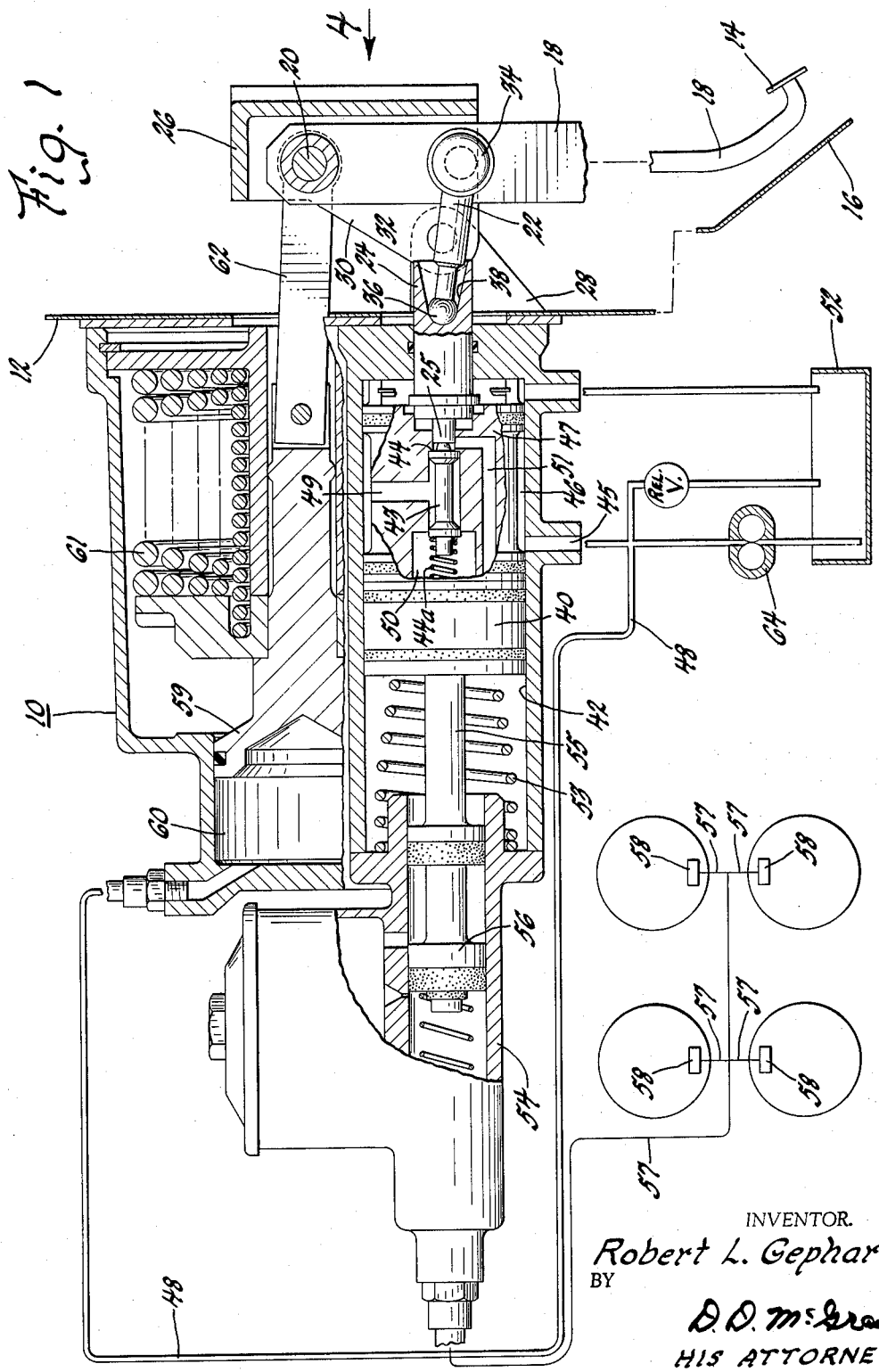

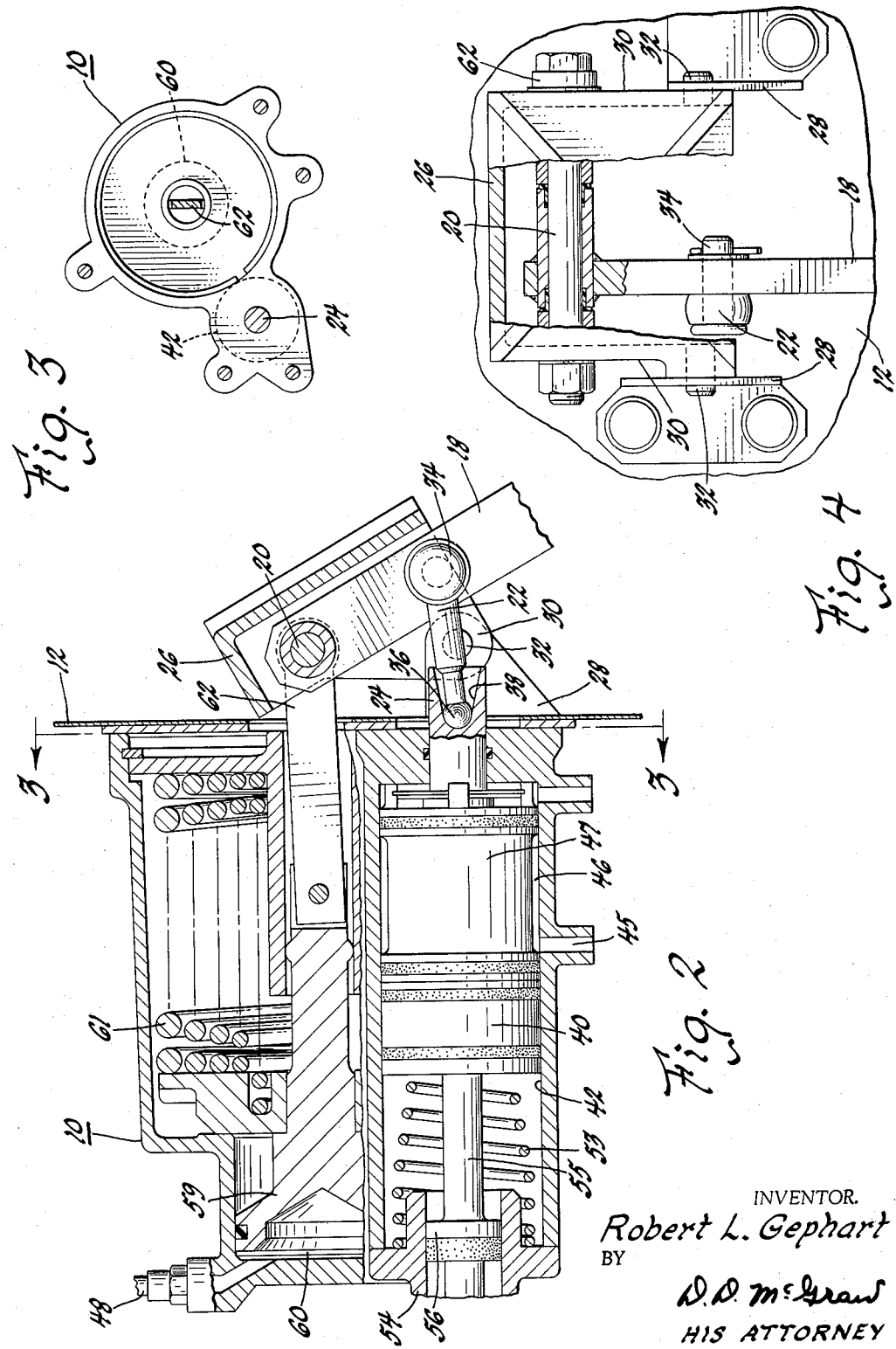

3,250,183
POWER BRAKE PEDAL RATIO CHANGING MECHANISM
Robert L. Gephart, Spring Valley, Ohio, assignor to General Motors Corporation, Detroit, Mich., a corporation of Delaware
Filed Oct. 4, 1963, Ser. No. 314,044
6 Claims. (Cl. 91—391)

This invention relates to power braking apparatus and more particularly to a type of power brake wherein the pedal level is automatically raised when power failure is experienced.

It is desirable in the use of power brakes for vehicles to provide an alternate method of stopping the vehicle if the power system fails. It is also desirable in braking systems for vehicles to have a brake pedal that is mounted relatively close to the floor and operates with very little pedal movement. The braking art is replete with power braking systems having an unpowered alternate braking system and brake pedals that require very little movement to operate. However, an acceptable system combining the aforementioned desirable features is not found in the prior art.

It is an object of the present invention to provide an improved flush mounted power braking system having an alternate unpowered mode of operation.

It is another object of the present invention to provide an improved flush mounted brake pedal having little operational travel combined with apparatus which provides an alternate unpowered mode of operation with much greater travel of the brake pedal.

It is still another object of the present invention to provide an improved means for varying the amount of brake pedal movement during powered and unpowered operation thereof.

It is a further object of the present invention to provide a means for changing the mechanical advantage of a brake pedal during unpowered operation of a braking system from that available during powered operation of said system.

It is yet a further object of the present invention to provide a means, integral to a typical power braking system, which will automatically change the pivotal axis of a brake pedal upon a loss of pressure in the power system.

Further objects and advantages of the present invention will be apparent from the following description, reference being had to the accompanying drawings wherein a preferred embodiment of the present invention is clearly shown.

In the drawings:

FIGURE 1 is an elevational view with parts broken away of a hydraulic power booster actuated brake system with the pedal being shown in the flush mounted position;

FIGURE 2 is an elevational view with parts broken away of a hydraulic power booster actuated brake system with the pedal being shown in the position it will assume during unpowered operation;

FIGURE 3 is a sectional view taken along line 3—3 of FIGURE 2;

FIGURE 4 is a view with parts broken away illustrating the pedal suspension linkage as viewed in the direction of the arrow 4 of FIGURE 1.

Referring now to FIGURE 1, a power head generally designated by the numeral 10 is mounted on a fire wall 12 of an automobile, not shown. A brake pedal 14 is suspended above a floor board 16 of said automobile. The proximity of the brake pedal 14 to the floor board 16 can be varied, but, for purposes of this explanation, the relationship of the brake pedal to the floor board will be referred to as a flush mounting. The brake pedal 14 is carried by a brake lever 18.

As best seen in FIGURE 4, the brake lever 18 is hung in a pendulum-like fashion from a pivot 20 and is adapted to lever a push rod 22 towards a valve driver 24. The valve driver 24 includes a sleeve 25 that serves to move a valve during actuation and serves as a relief valve during retraction. A cover 26 composed of any suitable material serves to cover the pivot and push rod operating area. A pivot support 28 carries a link 30 to the pivot 20 and acts as a radial locator for the brake lever 18 as it moves around a pivot 32. The cover 26 and the link 30 are integrally formed. The push rod 22 is adapted to pivot around a pivot 34 during the actuation of the braking system.

Referring now to FIGURE 1, the push rod 22 has a ball-shaped end 36 disposed in a pocket 38 of the valve driver 24. A power piston 40 is disposed for sliding movement in a bore 42 and is illustrated as being controlled by a valve 43. The valve 43 is of the equipoised variety and is arranged to be moved off a seat 44 by the valve driver 24 in response to pedal pressure. A pump 64 through a pressure inlet 45 pressurizes a circumferential groove 46 in a valve housing 47 as well as pressurizing a compartment 60 through a line 48. A passage 49 keeps the valve 43 in pressure communication with the groove 46. A passage 50 connects passage 49 with the force side of the power piston 40. A passage 51 through the housing 47 serves as a return line from the force side of the power piston to a reservoir 52. A spring 53 serves to bias the power piston 40 away from a master cylinder 54. A connecting rod 55 engages the power piston 40 in any well-known manner on one end and serves to drive a fluid displacing plunger 56 through the master cylinder 54.

The master cylinder 54 is of common design and serves as a reservoir for hydraulic fluid in a braking system comprising a series of distribution lines 57 and a plurality of wheel cylinders 58.

A piston 59 is disposed for sliding movement in a compartment 60 of the power head 10. A spring pack 61 serves to bias the piston 59 in a leftward direction as viewed in FIGURE 1. A member 62 serves as a link between one end of the piston 59 and the pivot 20. The relationship of the compartment 60 to the bore 42 is best seen in FIGURE 3.

In operation, a pump 64 provides pressure to the circumferential groove 46 and the compartment 60 through an inlet 45. The valve 43 is of the equipoised variety and so the pressure is contained while the valve 43 is resting against the seat 44. The compartment 60 is likewise pressurized and this pressurization of the compartment 58 serves to hold the piston 59 against the biasing force of the spring pack 61. It is apparent that the pivot 20 is held away from the fire wall 12 due to its engagement with the piston 59 through the linking member 62. Therefore, the brake pedal 14 is suspended in close proximity to the floor board 16 because of the alignment of the brake lever 18 around the pivot 34. This configuration of parts is illustrated in FIGURE 1.

As pressure is exerted on the brake pedal 14, the brake lever 18, pendantly suspended from the pivot 20, will drive the push rod 22 against the valve driver 24. The valve driver 24 through the sleeve 25 will move the valve 43 off the seat 44 and cause a build-up of pressure on the force side of the piston 40. This build-up of pressure will cause the piston 40 to move leftwardly in the bore 42, as viewed in FIGURE 1, against the biasing force of the spring 53. The engagement of the connecting rod 55 to the piston 40 will cause a corresponding leftward movement of the plunger 56, thereby displacing brake fluid from the master cylinder 54 through the lines 57 into the wheel cylinders 58. The wheel cylinders 58 are associated with braking devices in any well-known manner which causes a braking action to occur in the wheels of the vehicle.

As pressure is released from the brake pedal 14, the pedal will be returned in any suitable manner and the valve 43 will center itself to the passage 49 due to the force of a spring 44A and will reseat itself on the seat 44. The sleeve 25 will be drawn away from the valve 43 and so the pressure on the power piston will be relieved to the reservoir through the passage 51 past the valve 43. This release of pressure from the force side of the piston 40 will allow the spring 53 to take over and drive the piston 40 in a rightward direction as viewed in FIGURE 1.

It is apparent from the description of the cycle just described that very little movement of the brake pedal 14 is necessary to allow pressure to go to the power piston 40 and cause the displacement of the brake fluid to the wheel cylinders.

If a leak develops in the inlet lines or the pump 64 ceases to function, it is possible to displace brake fluid from the master cylinder 54 as a mechanical connection is established between the valve driver 24, the complete valve housing 47, the power piston 40, and the connecting rod 55. This direct mechanical link will allow any pressure exerted on the push rod 22 to be immediately transmitted to the plunger 56.

This invention is meant to obviate this problem as will be more clearly seen from an analysis of FIGURE 2.

Referring now to FIGURE 2, it will be assumed that the pump 64 has ceased to function. Therefore, pressure to the compartment 60 will be lost and the biasing force of the spring pack 61 will drive the piston 59 in a leftward direction as viewed in FIGURE 2. This movement of the piston 59 will draw the pivot 20 in the direction of the fire wall 12 due to the engagement of the pivot 20 to the piston 59 through the linking member 62. This movement of the pivot 20 around the pivot axis 32 through the link 30 will cause the pivot 34 to be drawn up as viewed in FIGURE 2. The push rod 22, being of constant length and pivoting in the grooved portion 38 of the valve driver 24, will act as a fixed pivot around which the brake pedal 14, through the brake lever 18, will move. Therefore, the brake pedal 14 will move away from the floor board 16 and will be suspended at a greater distance therefrom. This greater distance will allow a greater movement of the push rod 22 and will also poise the brake pedal 14 at a point where it offers greater mechanical advantage to one pressing the brake pedal.

It thus becomes apparent that the failure of the pump 64 and the consequent loss of pressure to the compartment 60 will automatically position the brake pedal 14 at a point where the direct mechanical linkage, previously described, can be used to displace hydraulic fluid into the cylinders of the braking system in a most advantageous manner.

The utility of the present invention resides in the fact that a brake pedal having a power booster to assist in its operation can be suspended very close to the floor board of a vehicle where very little movement for actuation is necessary and can be automatically positioned at a greater distance from the floor board when a greater amount of movement is necessitated by a power failure.

While the embodiment of the present invention, as herein disclosed, constitutes a preferred form, it is to be understood that other forms might be adopted.

What is claimed is as follows:

1. A brake operating mechanism comprising: a brake pedal arranged to move in a pendulum manner around an axis, said brake pedal engaging a power brake operating system, said power brake operating system including a power system therefor, and a rod means engaging said axis and the power system, said rod means being responsive to a change in pressure in said power system to vary the linear position of said axis relative to said brake system, said moving of the pivot axis allowing the pendulum movement of said brake pedal around said axis to vary in proportion to the distance said axis is moved.

2. A brake operating mechanism for a hydraulic braking system including a pressure means and a control means therefor comprising: a lever actuator means having one end adapted for pivotal movement around an axis, said lever actuator means having another portion engaging said pressure control means, and a rod means being biased against hydraulic pressure, said rod means having an extension therefrom carrying said axis, said rod means being responsive to a change in hydraulic pressure to move said axis, said lever actuator means being allowed to pivotally move a varying amount around said axis as said axis is moved.

3. A brake operating mechanism for a hydraulic braking system, said hydraulic system having a pressure source and a control means therefor, said brake operating mechanism comprising: a control body having a power piston and a fluid responsive means therein, an actuator lever being arranged to pivot around one end of said fluid responsive means and having another portion in driving engagement with said power piston, said fluid responsive means moving said pivot end to any one of a plurality of positions intermediate two extreme positions as the pressure in said hydraulic system varies thereby allowing said actuator lever means to move through a plurality of pivotable ranges during actuation of said power piston.

4. A brake operating mechanism for a hydraulic braking system having power operated means thereof and means for mechanical operation thereof, said brake operating mechanism comprising: an actuator lever adapted for pivotal movement around an axis through a predetermined range, a power piston arranged to operate in response to the power operated means and having a portion adapted to engage said actuator lever for mechanical operation thereof, and a biased fluid responsive means having a portion carrying the axis around which said actuator lever rotates said predetermined amount, said fluid responsive means being biased in a first direction against hydraulic pressure, said fluid responsive means being caused to move in said first direction as hydraulic pressure decreases in the power operated means, said movement causing a relocation of said actuator lever pivotal axis thereby allowing said actuator lever to move through a varying range around said pivotal axis during said period of decreasing pressure, said varying range of pivotal movement increasing the mechanical advantage of said actuator lever during mechanical actuation of said braking system.

5. A brake operating system comprising a power operable means and a mechanically operable means, said power operable means including a pressure source, a power piston adapted to dispense said pressure, a valve means arranged to control pressure to said piston, and a rod engaging said valve means and being arranged to move said valve means into a plurality of positions, said rod, said valve means, and said piston comprising a continuous mechanical link when said valve means is in a fully open position, said mechanically operable means comprising: an actuator lever arranged to move through a predetermined range, a fluid responsive piston being biased in one direction against said pressure, a link rod engaged on one end by said fluid responsive piston, and a pivot axis means carried on another end of said link rod and engaging said actuator lever during pivotal movement thereof, said pressure responsive piston being arranged to move said pivot axis into a plurality of positions as pressure decreases from said pressure source, said movement of the pivot axis allowing said actuator lever to move through an increasing range of pivotal movement during a period while pressure is decreasing from said pressure source, said pressure responsive means ultimately moving said pivot axis to an extreme position wherein said actuator lever is allowed to move through a maximum range around said pivot axis and establish a maximum mechanical advantage for operation of said direct mechanical link as the pressure from said pressure source completely diminishes thereby allowing mechanical operation of the brake operating system.

6. Brake control mechanism for a fluid operable device comprising: a brake operating lever having one end pivotably movable about an axis and having an output member adapted for movement in accordance with movement of said lever, a fluid pressure actuated servomotor connected for control by said output member and for mechanical force transmitting relation intermediate said output member and the fluid operable device, and means responsive to a decrease in maximum fluid pressure available for operating said servomotor to move the lever axis within a predetermined range commensurate with the decrease in available pressure, said lever being arranged to be rotatable in increasing amounts about the axis as the axis is moved pursuant to a decrease in available pressure at said servomotor.

References Cited by the Examiner

UNITED STATES PATENTS

| | | | |
|---|---|---|---|
| 2,706,020 | 4/1955 | Freers et al. | 188—152.44 |
| 2,755,891 | 7/1956 | Levell et al. | 188—152.44 |
| 2,848,980 | 8/1958 | Ayers | 91—433 |
| 2,910,147 | 10/1959 | Fishtahler | 188—152.44 |
| 3,063,427 | 11/1962 | Hill | 91—391 |
| 3,128,676 | 4/1964 | Ayers | 91—391 |
| 3,182,562 | 5/1965 | Pulkownik et al. | 91—391 |

SAMUEL LEVINE, *Primary Examiner.*

FRED E. ENGELTHALER, *Examiner.*

P. E. MASLOUSKY, *Assistant Examiner.*